United States Patent [19]

Lachmann

[11] Patent Number: 4,503,971
[45] Date of Patent: Mar. 12, 1985

[54] CONVEYING PLANT

[76] Inventor: Hans-Peter Lachmann, Drosselweg 29, 5000 Köln 60, Fed. Rep. of Germany

[21] Appl. No.: 412,978

[22] Filed: Aug. 27, 1982

[51] Int. Cl.³ .............................................. B05G 23/14
[52] U.S. Cl. ..................................... 198/833; 198/711
[58] Field of Search ............... 198/833, 711, 819, 832, 198/823

[56] References Cited

FOREIGN PATENT DOCUMENTS 156099 12/1951 Australia ............................ 198/819
1203672 10/1965 Fed. Rep. of Germany ...... 198/819
737338 9/1955 United Kingdom ................ 198/823

Primary Examiner—Joseph E. Valenza
Assistant Examiner—Jonathan D. Holmes
Attorney, Agent, or Firm—Karl F. Ross; Herbert Dubno

[57] ABSTRACT

A conveying plant in which a bucket-type conveying belt has along its opposite longitudinal edges, which are transversely spaced apart, successions of pairs of blocks which form guide rails for the conveyor. The blocks can clamp over steep stretches of the belt, respective traction ropes which are driven to relieve the belt.

10 Claims, 10 Drawing Figures

CONVEYING PLANT

FIELD OF THE INVENTION

The invention relates to a conveying plant with a conveyor belt equipped with carriers, said plant featuring at least one section for steep or vertical conveyance for the hoisting of the material to be conveyed to a higher level.

BACKGROUND OF THE INVENTION

In many industrial branches, especially in mining, however, also in ship unloading and loading operations, it is necessary to pass over from a possibly long, continuous horizontal conveyance through a close bend to a steep or vertical conveyance; then to bridge-over great hoisting heights, and to proceed then again horizontally.

The standard conveying plant with a rubber conveyor belt is not suitable therefor because of the limitation of its hoisting height—due to the strength of the plies and of the limitation of the climbing angle (max. approx. 25°). Known bucket conveyors with chains or belts and steel buckets have a limited capacity and are clumsy. Conveying plants with flat conveyor belts, equipped with corrugated edges and/or bucket-type carriers and which are capable of conveying horizontally or vertically, are similarly known. However, these conveying plants also have a restricted hoisting height because of the limited strength of the plies, and their construction is extremely costly.

OBJECT OF THE INVENTION

The object of the invention is to realize a conveying plant capable of hoisting the goods to be conveyed by means of a conventional conveyor belt to any level desired.

SUMMARY OF THE INVENTION

This object is attained with a conveying plant of the type initially defined by providing a releasable connection of the conveyor belt in the section of steep or vertical conveyance with at least one traction rope separately driven by a drive unit, in such a manner as to ensure that the traction rope transmits its tractive force to the conveyor belt. Two traction ropes are preferably used for each conveyor belt, said ropes being releasably connected to the edge zones of the conveyor belts.

In accordance with the invention, therefore, the plies of the conveyor belt are relieved by the traction rope in the areas of steep or vertical conveyance, so that their strength is of secondary importance for the hoisting height to be overcome.

In the apparatus of the invention, the drive power for the traction rope is designed and adjusted in such a manner as to ensure that the tractive force exerted by the traction rope on the conveyor belt is at least of the order of magnitude required to hoist the material to be conveyed. This makes it possible to achieve, regardless of the conveyor belt ply, the hoisting height permitted by the strength of the traction rope.

In order to overcome extremely great differences in height the traction rope load can be reduced by successively arranging at least two endless traction ropes one after the other.

In a conveying plant in which the conveyor belt is carried by support pulleys on running rails attached to its two edges and guided by guide pulleys, the running rails are, in accordance with another feature of the invention, of a two-part design in longitudinal direction, and a hollow space is provided between the two parts of the running rails for the wedging in of the traction rope.

In order to ensure a sufficiently reliable hold of the traction rope by the two parts of the running rail, on the one hand, and to enable the opening of the two parts upon introduction of the traction rope, on the other hand, the two parts of the running rail are connected with one another by means of spring elements in accordance with another feature of the invention.

The introduction of the traction rope between the two parts of the running rail is considerably facilitated by the fact that both parts of the running rail feature a chamfer on their sides facing away from the conveyor belt and towards each other.

In another design of the invention, the introduction of the traction rope between the two parts of the running rail can be facilitated by the arrangement of a pressure pulley at the lower end of the section for steep or vertical conveyance, said pressure pulley exerting a pressure on the traction rope in the direction of the hollow space between the two parts of the running rail.

In certain cases it may be appropriate to connect also the descending side of the conveyor belt to the traction rope. In this case, a pressure pulley is provided also at the upper end of the section for steep or vertical conveyance, said pressure pulley exerting a pressure on the traction rope in the direction of the hollow space between the two parts of the running rail.

In a preferred design of the invention, the running rails consist of individual blocks arranged successively at a small distance from one another in the longitudinal direction of the conveyor belt.

In order to ensure that the blocks form as few interrupted running grooves as possible also at bends, the ends of the blocks are stepped in accordance with another feature of the invention and have a groove at one of their ends, and at the other end a nose-shaped projection engaging the groove of the adjacent block.

SPECIFIC DESCRIPTION

Figure 1:
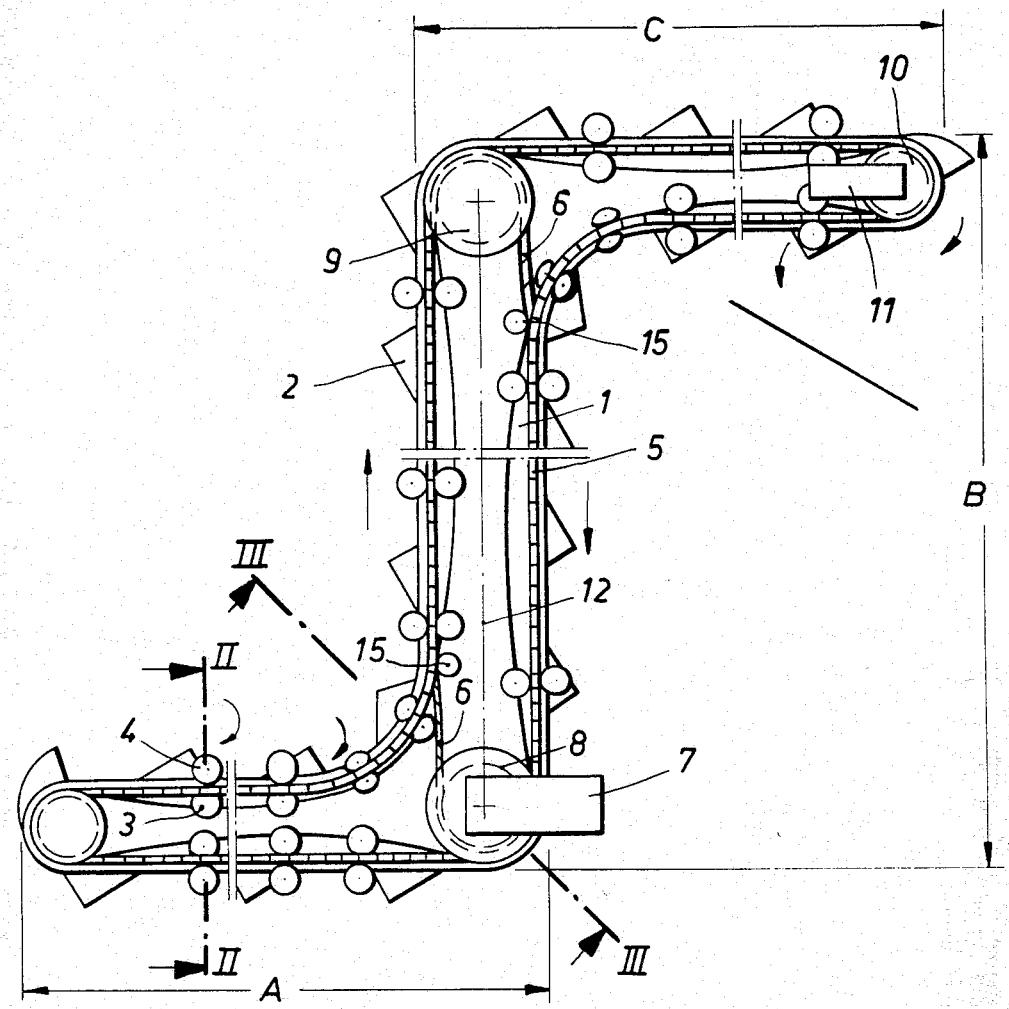
FIG. 1 is a conveying plant in side view.

The conveying plant shown in FIG. 1 features two sections A and C for horizontal conveyance, and one section B for steep and vertical conveyance. The conveyor belt 1 of the conveying plant is provided with carriers 2; it is carried by support pulleys 3 and guided by means of guide pulleys 4, the support pulleys 3 and the guide pulleys 4 being mounted on the supporting structure of the conveying plant and operating jointly with the running rails 5, which are fastened to the conveyor belt 1 (refer to FIGS. 2 and 3).

In the section B for steep or vertical conveyance the conveyor belt 1 is connected with traction ropes 6, which are driven by a drive unit 7 by means of a drive pulley 8. The top deflection pulleys 9 for the traction rope 6 can be connected to a drive unit. The conveyor belt 1 is driven via a drive drum 10 connected to a drive unit 11.

The conveying plant can be swung about the longitudinal axis 12 of the section B for steep or vertical conveyance, so that the upper section C for horizontal conveyance does not have to feature the same direction as the lower section A for horizontal conveyance.

Figure 2:
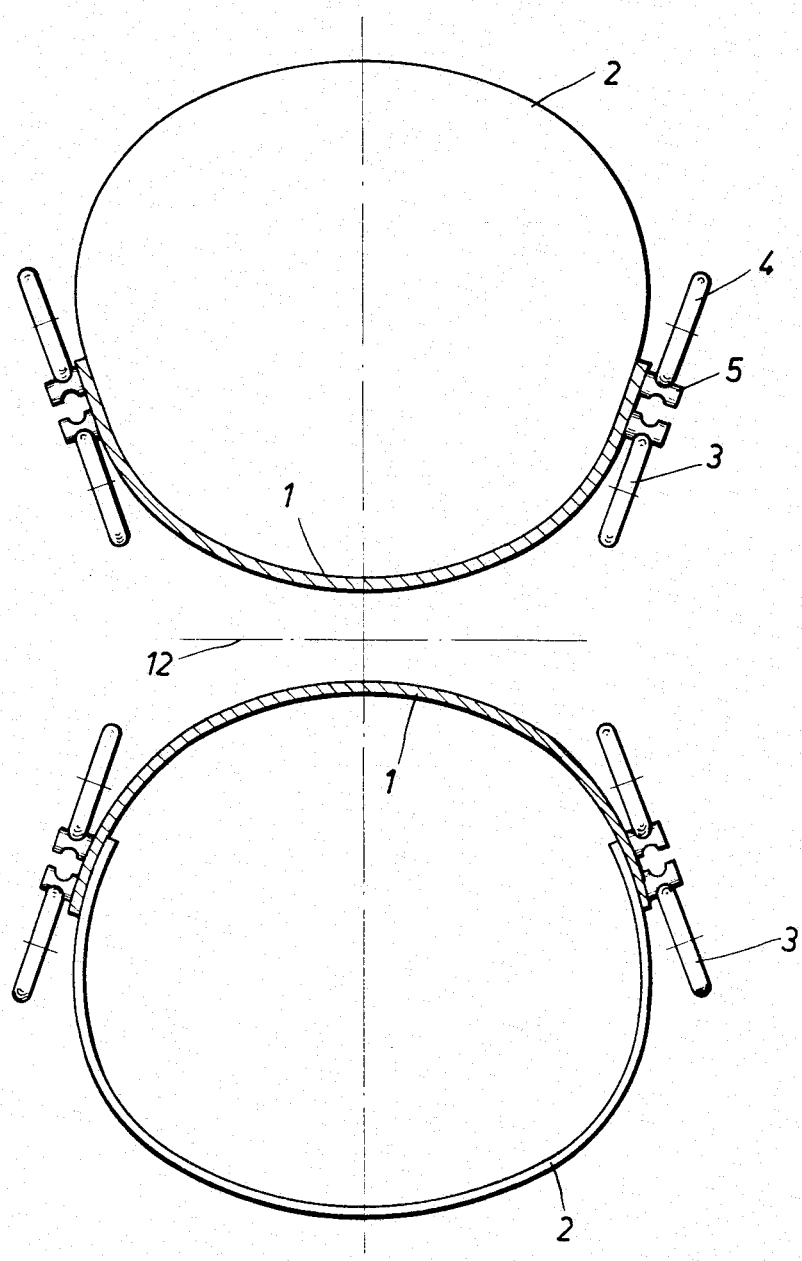
FIG. 2 is a section along the line II—II in FIG. 1.
Figure 3:
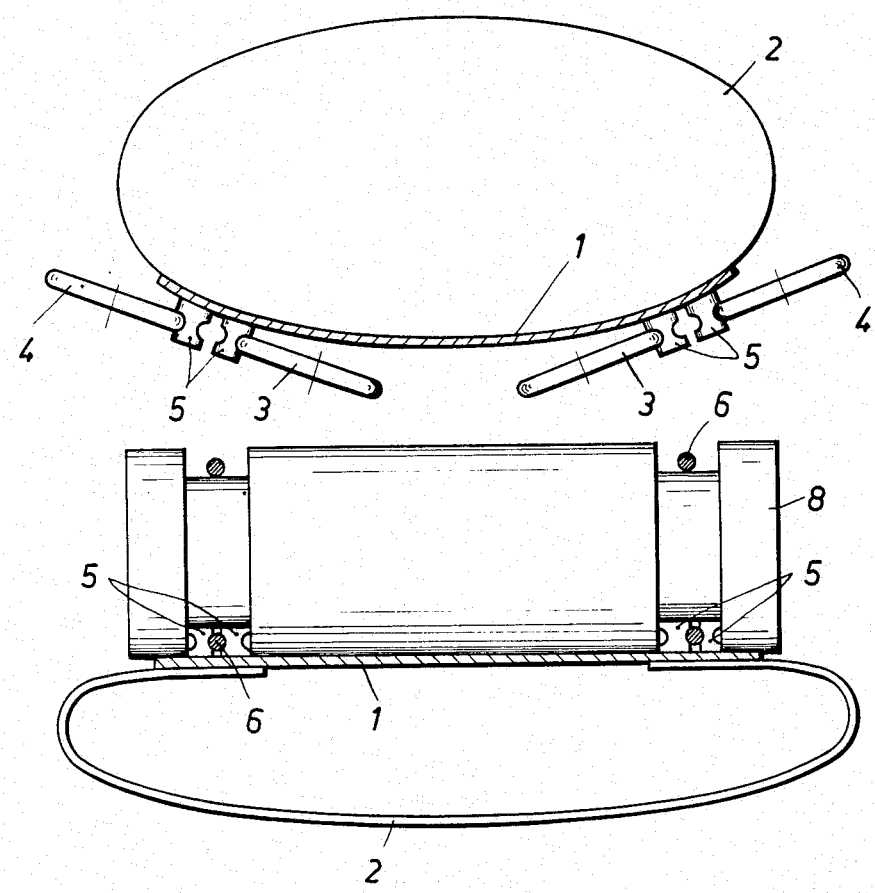
FIG. 3 is a section along the line III—III in FIG. 1.

As illustrated by FIGS. 2 and 3, the running rail 5 is of two-part design, the two parts of running rail 5 being connected with one another by spring elements 13. A hollow space is provided between the two parts of the running rail 5 for wedging in the traction rope 6.

Figure 4:
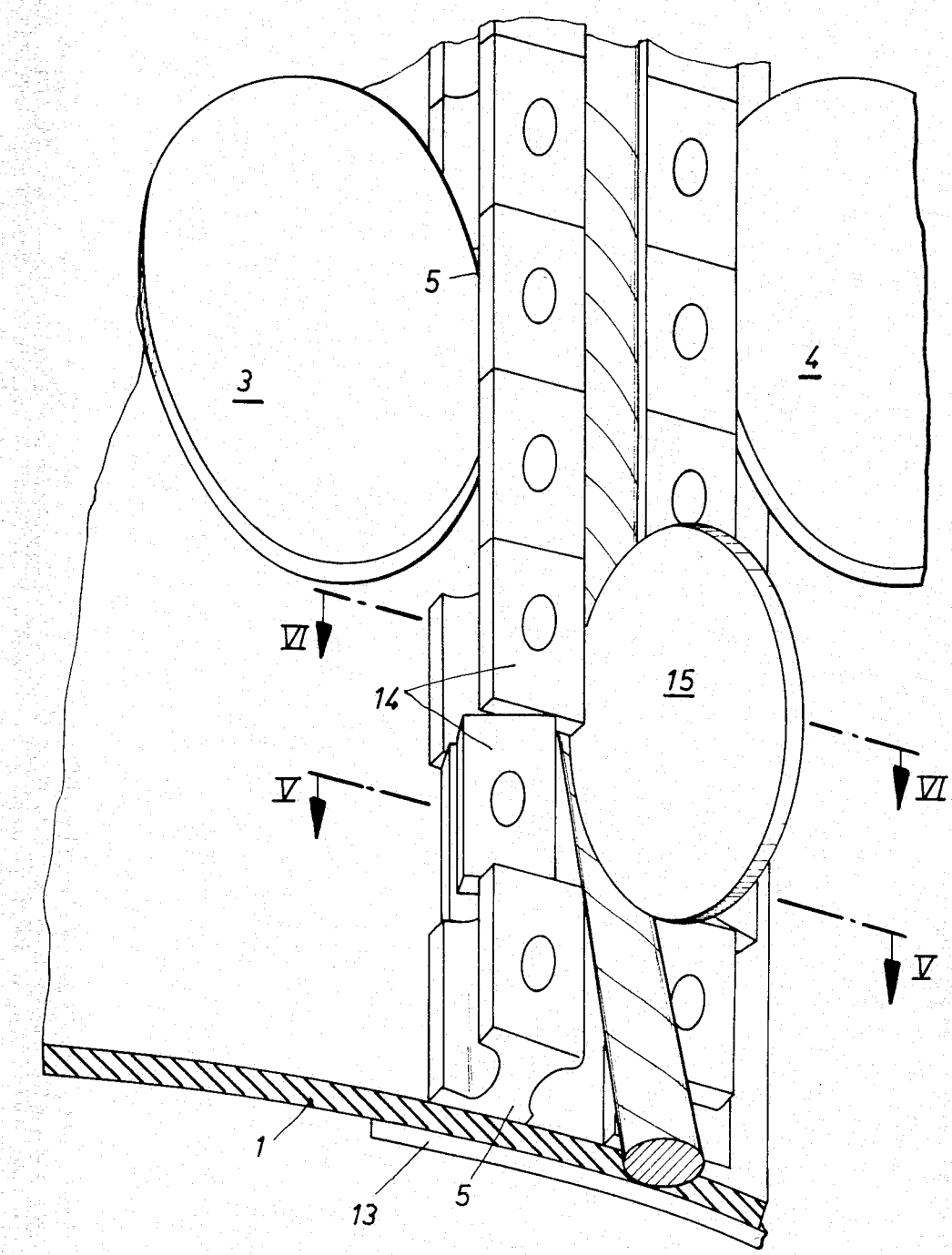
FIG. 4 shows the portion of the conveying plant, in which the connection of the traction rope to the conveyor belt is made, in perspective representation.
Figure 5:
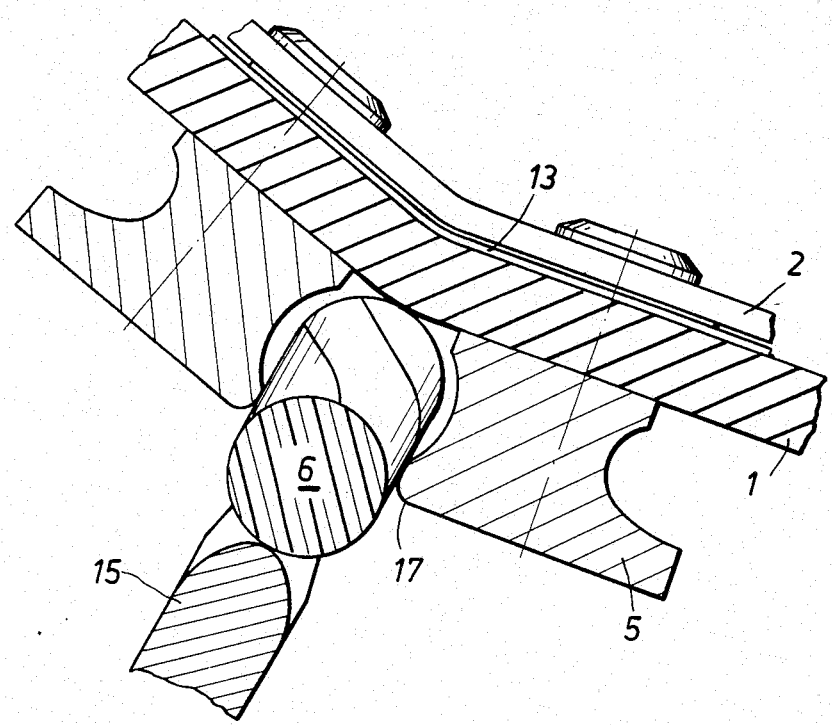
FIG. 5 is a section along the line V—V in FIG. 4.
Figure 6:
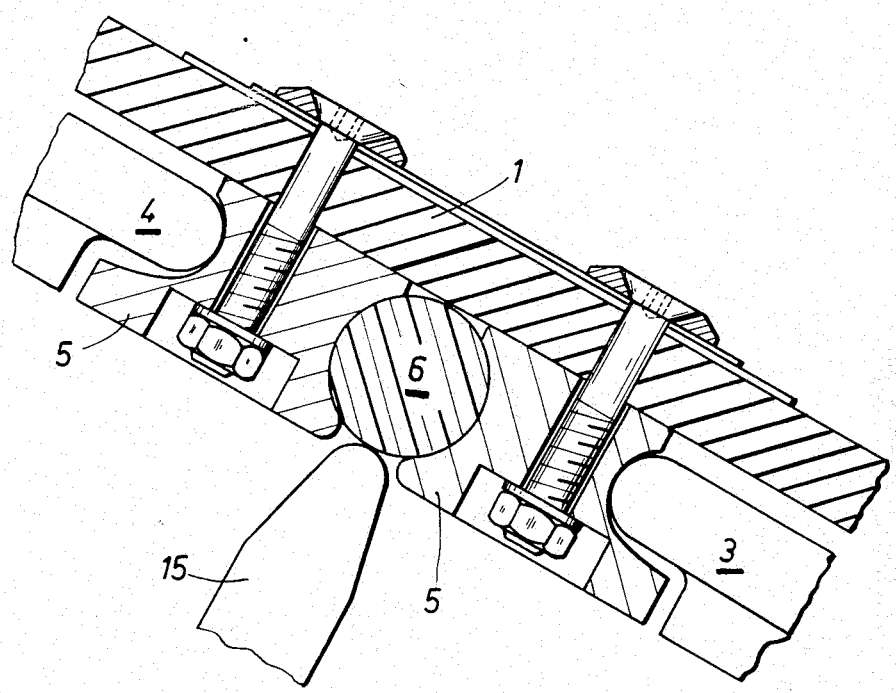
FIG. 6 is a section along the line VI—VI in FIG. 4.

FIGS. 4 and 6 show the introduction of the traction rope 6 into the hollow space between the two parts of the running rail 5, which is made up of the individual blocks 14. A pressure pulley 15 pushes the traction rope 6 between the blocks 14 forming the running rail 14, the support pulleys 3 and the guide pulleys 4 serving as abutment in the area of the pressure pulley 15.

Figure 7:
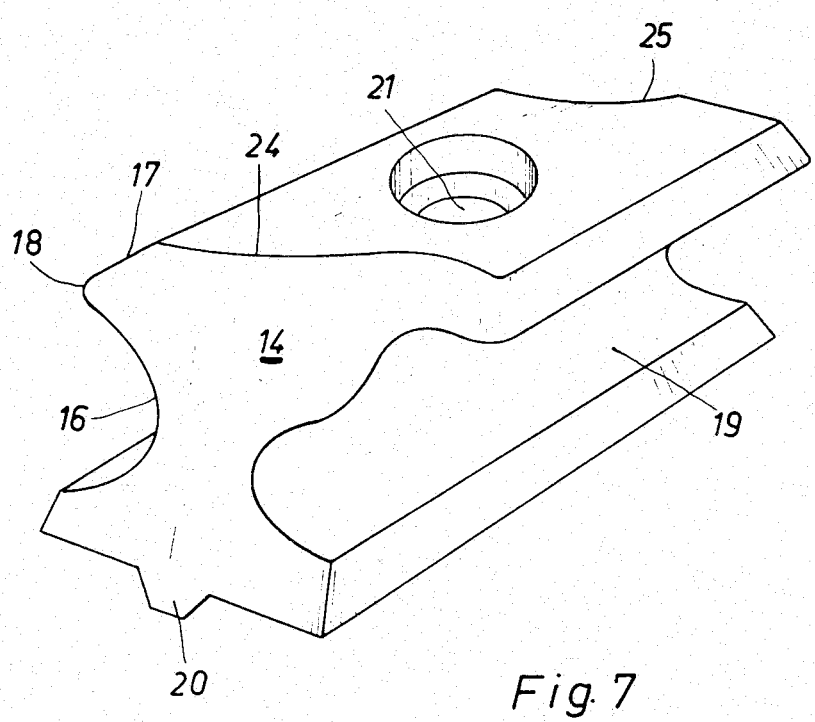
FIG. 7 shows one of the blocks forming the running rail, in perspective representation.

The block 14 illustrated in FIG. 7 features a semicircular recess, which forms together with a corresponding recess of the further block opposite to block 14 the hollow space for the traction rope 6 (refer to FIG. 3). A chamfer and an adjacent radius 18 facilitate the introduction of the traction rope 6. Block 14 with a running groove 19 for the support pulleys 4 and the guide pulleys 5 is provided on the side opposite to the recess 16. Block 14 features, furthermore, a projection 20, which engages a corresponding groove of the conveyor belt 1. The attachment of block 14 to the conveyor belt 1 is made by means of bolts introduced through a bore 21.

Figure 8:
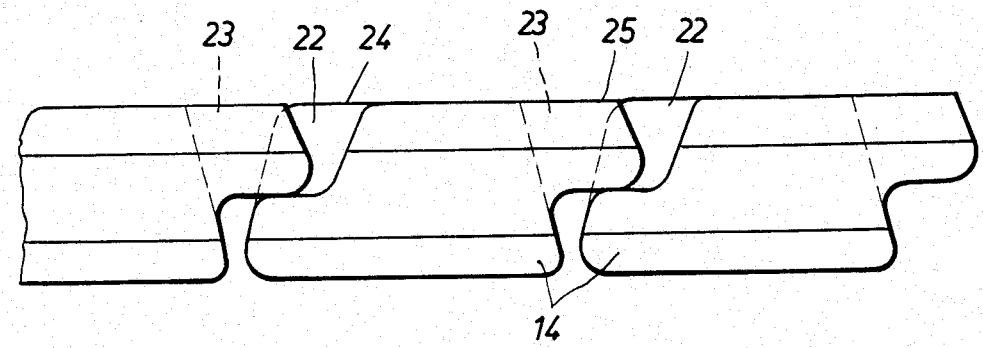
FIG. 8 shows one running rail in prolate arrangement, in side view.
Figure 9:
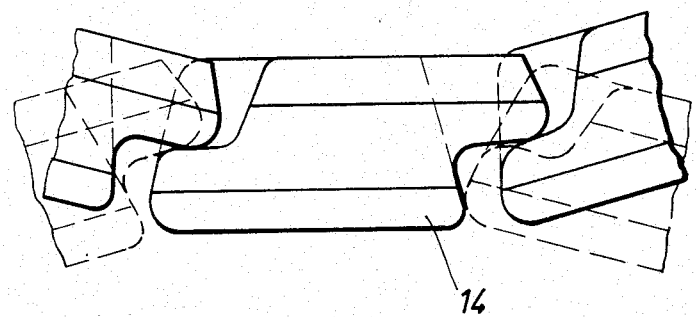
FIG. 9 shows the running rail according to FIG. 8 in arched arrangement.

FIGS. 8 and 9 show several successively arranged blocks 14, provided at their ends with meshing nose-shaped projections 22 and grooves 23. Their edges 24 and 15 and their flank surfaces are appropriately arranged diagonally to the transverse direction of the blocks.

Figure 10:
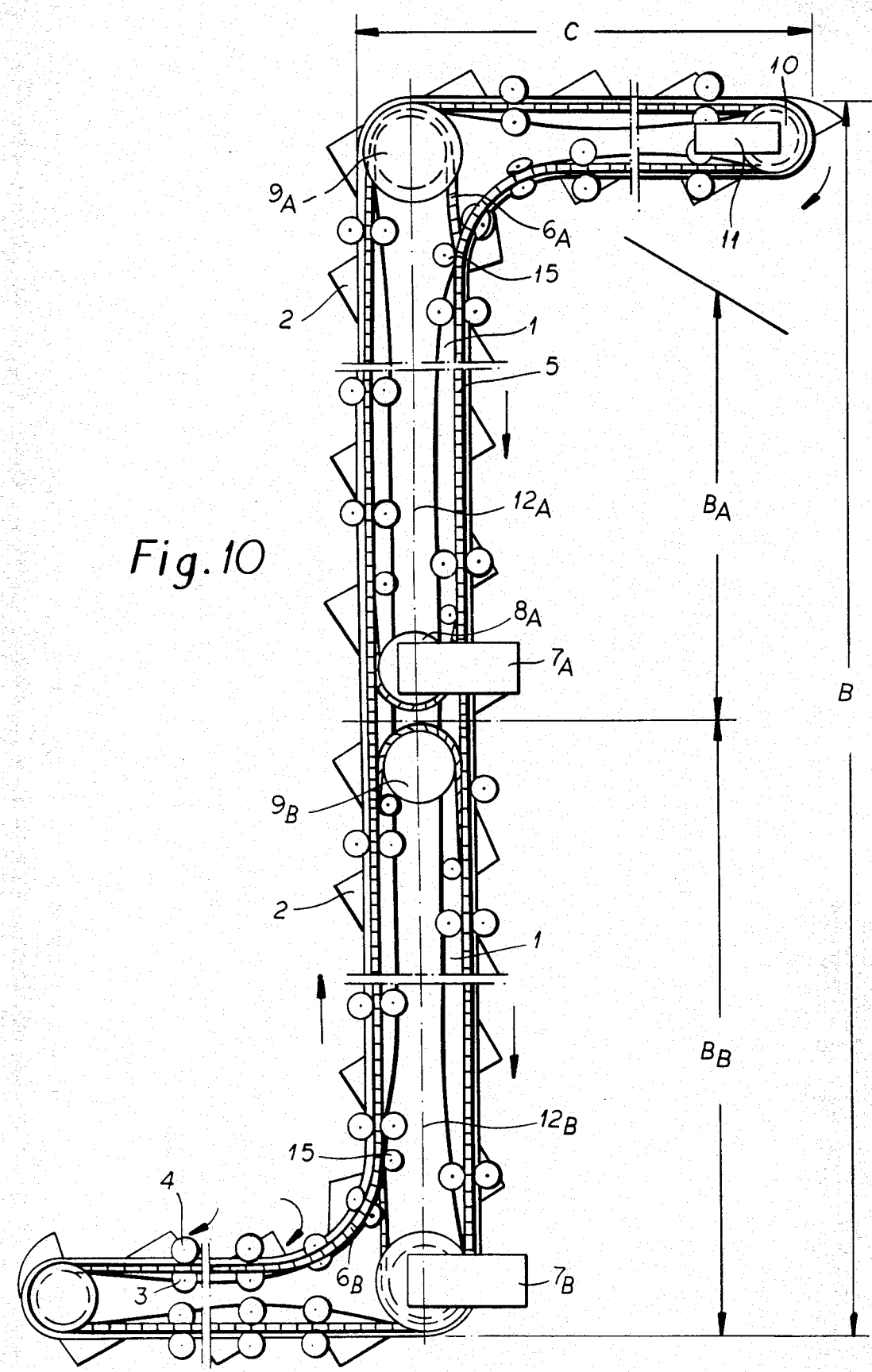
FIG. 10 is a side elevational view similar to FIG. 1 but illustrating an embodiment in which successive traction ropes engage each rail along the steep section.

FIG. 10 shows an embodiment which differs from that of FIG. 1 in that a second endless rope 6A passing over the pulleys 8A and 9A is provided to engage the ascending rails after the rope 6B passing over the pulleys 8B and 9B is withdrawn. The respective drives for the two ropes are shown at 7A and 7B, respectively, and the two portions of the vertical section are represented at $B_A$ and $B_B$ to span the full height B. Otherwise the same reference numerals are used in FIG. 1 to identify identical elements.

I claim:

1. A conveying plant comprising:
   an endless conveyor belt having a pair of transversely spaced opposite longitudinal edges and spaced apart carriers formed along one surface thereof adapted to receive material to be conveyed by said belt;
   respective guide rails formed on said longitudinal edges and comprising pairs of blocks spreadable from one another and fixed in succession along the respective edges and forming guides for said edges along the full lengths thereof;
   means including said guides defining at least one relatively steep section ascended by said conveyor belt;
   respective endless ropes flanking said conveyor belt and having traction passes receivable between the blocks along each of said edges and clampingly engaged by said blocks for supporting said conveyor belt as said conveyor belt ascends along said section, said ropes passing into and out of said rails at lower and upper regions of said section respectively;
   means fixedly positioned along said section engaging said rails for clamping said passes between said blocks; and
   a drive unit for displacing said ropes so that said traction passes transmit tractive force to said belt when said traction passes are clamped between the pairs of blocks forming the rails along the longitudinal edges of said belt.

2. The conveying plant defined in claim 1 wherein said drive unit is dimensioned to apply to said ropes traction forces at least of an order of magnitude sufficient to lift said material.

3. The conveying plant defined in claim 1 wherein two endless traction ropes are provided along each of said edges at said section for successive engagement with the block pairs of each rail.

4. The conveying plant defined in claim 1 wherein said means fixedly positioned along said section includes pairs of guide pulleys pressing the blocks of said rails toward one another, said blocks having cavities confronting one another for receiving the respective rope.

5. The conveying plant defined in claim 1 wherein the blocks of each pair are interconnected by spring elements.

6. The conveying plant defined in claim 1 wherein the blocks of each pair are chamfered on sides thereof facing away from the conveyor belt and toward each other.

7. The conveying plant defined in claim 1, further comprising a pressure pulley at a lower end of said section for pressing said rope between the blocks of a respective rail.

8. The conveying plant defined in claim 1 wherein a pressure pulley is provided at an upper end of said section for pressing each rope between the blocks of a respective rail.

9. The conveying plant defined in claim 1 wherein said pairs of blocks are spaced slightly apart along the respective longitudinal edge.

10. The conveying plant defined in claim 1 wherein said blocks are stepped and each block has a nose-shaped projection engaging in a groove formed in an adjacent block.

* * * * *